(12) United States Patent
Wu

(10) Patent No.: US 12,498,802 B1
(45) Date of Patent: Dec. 16, 2025

(54) STYLUS GRIP FOR CAPACITIVE TOUCH AND WIRELESS CHARGING

(71) Applicant: Youyou Wu, Arcadia, CA (US)

(72) Inventor: Youyou Wu, Arcadia, CA (US)

( * ) Notice: Subject to any disclaimer, the term of this patent is extended or adjusted under 35 U.S.C. 154(b) by 0 days.

(21) Appl. No.: 18/772,621

(22) Filed: Jul. 15, 2024

Related U.S. Application Data

(60) Provisional application No. 63/526,551, filed on Jul. 13, 2023.

(51) Int. Cl.
*G06F 3/0354* (2013.01)

(52) U.S. Cl.
CPC ................................ *G06F 3/03545* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 2009/0073144 A1* | 3/2009 | Chen | | G06F 3/0488 |
| | | | | 345/179 |
| 2009/0205761 A1* | 8/2009 | Swan | | G06F 3/03545 |
| | | | | 150/165 |
| 2014/0354588 A1* | 12/2014 | Hsiao | | G06F 3/0442 |
| | | | | 345/174 |
| 2015/0029164 A1* | 1/2015 | Liu | | G06F 3/0383 |
| | | | | 345/179 |
| 2017/0108951 A1* | 4/2017 | Clements | | B25G 1/102 |

* cited by examiner

*Primary Examiner* — Patrick N Edouard
*Assistant Examiner* — Joseph P Fox
(74) *Attorney, Agent, or Firm* — QuickPatents; Kevin Prince

(57) ABSTRACT

A grip for a cylindrical capacitive touch stylus comprises an elongated grip member made of a resilient material. The grip member has a proximal end, a distal end, an outer surface, and an inner surface defining a central bore. An open truncated side edge extends between the proximal and distal ends, laterally exposing the central bore. This design allows a user to contact the stylus through the truncated side edge when inserted, enabling capacitive touch interaction. The grip may have a narrower mid-point diameter for ergonomic comfort and differently shaped ends for rotation and stability. An optional semi-rigid, inner C-shaped sleeve can be fixed to the inner surface to securely hold the stylus. The invention overcomes limitations of prior art grips by allowing direct stylus contact for capacitive touch functionality and permitting wireless charging without grip removal.

9 Claims, 6 Drawing Sheets

STYLUS GRIP FOR CAPACITIVE TOUCH AND WIRELESS CHARGING

CROSS REFERENCE TO RELATED APPLICATIONS

This application claims the benefit of U.S. Provisional Patent Application 63/526,551, filed on Jul. 13, 2023, and incorporated herein by reference.

STATEMENT REGARDING FEDERALLY SPONSORED RESEARCH AND DEVELOPMENT

Not Applicable.

FIELD OF THE INVENTION

This invention relates to computer input devices, and more particularly to a stylus grip that allows for capacitive touch and wireless charging.

BACKGROUND

Stylus grips available in the market present significant limitations for users of capacitive touch devices. These conventional grips typically encase the entire circumference of the stylus, creating a barrier between the user's hand and the stylus itself. This design drawback prevents direct contact between the user's skin and the stylus, which is crucial for capacitive touch interaction.

Capacitive touch technology relies on the electrical properties of the human body to function. When a user touches a capacitive stylus, it completes an electrical circuit, allowing the stylus to interact with the touch screen. However, the full-coverage design of traditional stylus grips interferes with this process, effectively insulating the user from the stylus and rendering the capacitive touch feature inoperable.

Another significant drawback of prior art stylus grips becomes apparent with the advent of wireless charging technology for styluses. Many modern styluses are designed to be recharged using inductive charging methods, which require close proximity between the stylus and the charging device. The conventional grips, which cover the entire length of the stylus, often obstruct the charging process. The material of these grips can also interfere with the magnetic field used in wireless charging, reducing efficiency or completely preventing the stylus from charging.

These limitations force users to choose between the comfort and improved grip provided by a stylus cover, and the full functionality of their stylus, including both capacitive touch capabilities and convenient wireless charging. This trade-off is far from ideal, especially for users who rely heavily on their styluses for work or creative pursuits.

Therefore, there is a need for a device that provides the comfort and improved handling of a stylus grip while still allowing for direct capacitive touch interaction with the stylus. Such a device should also permit wireless charging of the stylus without requiring removal of the grip. Additionally, an ideal solution would offer ergonomic benefits to reduce hand fatigue during extended use, and provide stability when the stylus is not in use. The present invention accomplishes these objectives.

SUMMARY OF THE INVENTION

The present invention relates to a grip for a cylindrical capacitive touch stylus. The grip comprises an elongated grip member made of a resilient material. This grip member has a 17 proximal end, a distal end, an outer surface, and an inner surface that defines a central bore. An open truncated side edge extends between the proximal and distal ends, laterally exposing the central bore. This design allows a user to contact the stylus through the truncated side edge when the stylus is inserted into the grip, enabling capacitive touch interaction with the stylus.

The grip may have a narrower diameter at its mid-point compared to its ends, providing an ergonomic shape. In some versions, the distal end is circular while the proximal end is triangular, or other shapes, offering stability when used.

An optional feature is a semi-rigid, inner C-shaped sleeve fixed to the inner surface of the grip member. This sleeve can flex outwardly to receive the stylus and hold it in place through friction. The sleeve may be less resilient than the grip member, balancing secure attachment to the stylus via the inner C-shaped sleeve with user comfort via the softer elongated grip member.

These features can be combined in different ways. For example, the grip with the narrower mid-point may include the inner sleeve, as may the version with differently shaped ends. In all cases, the invention aims to provide a comfortable, secure grip that allows for capacitive touch interaction with the stylus and that also allows wireless 14 charging with a wireless charging device.

The present invention addresses the drawbacks of prior art stylus grips by providing a device that offers the comfort and improved handling of a stylus grip while simultaneously allowing for direct capacitive touch interaction with the stylus. The invention also permits wireless charging of the stylus without requiring removal of the grip. Furthermore, the present invention incorporates ergonomic features to reduce hand fatigue during extended use and provides stability when the stylus is not in use. By solving these multiple issues, the present invention represents a significant advancement over existing stylus grip technology. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a 21 singular element.

Figure 1:
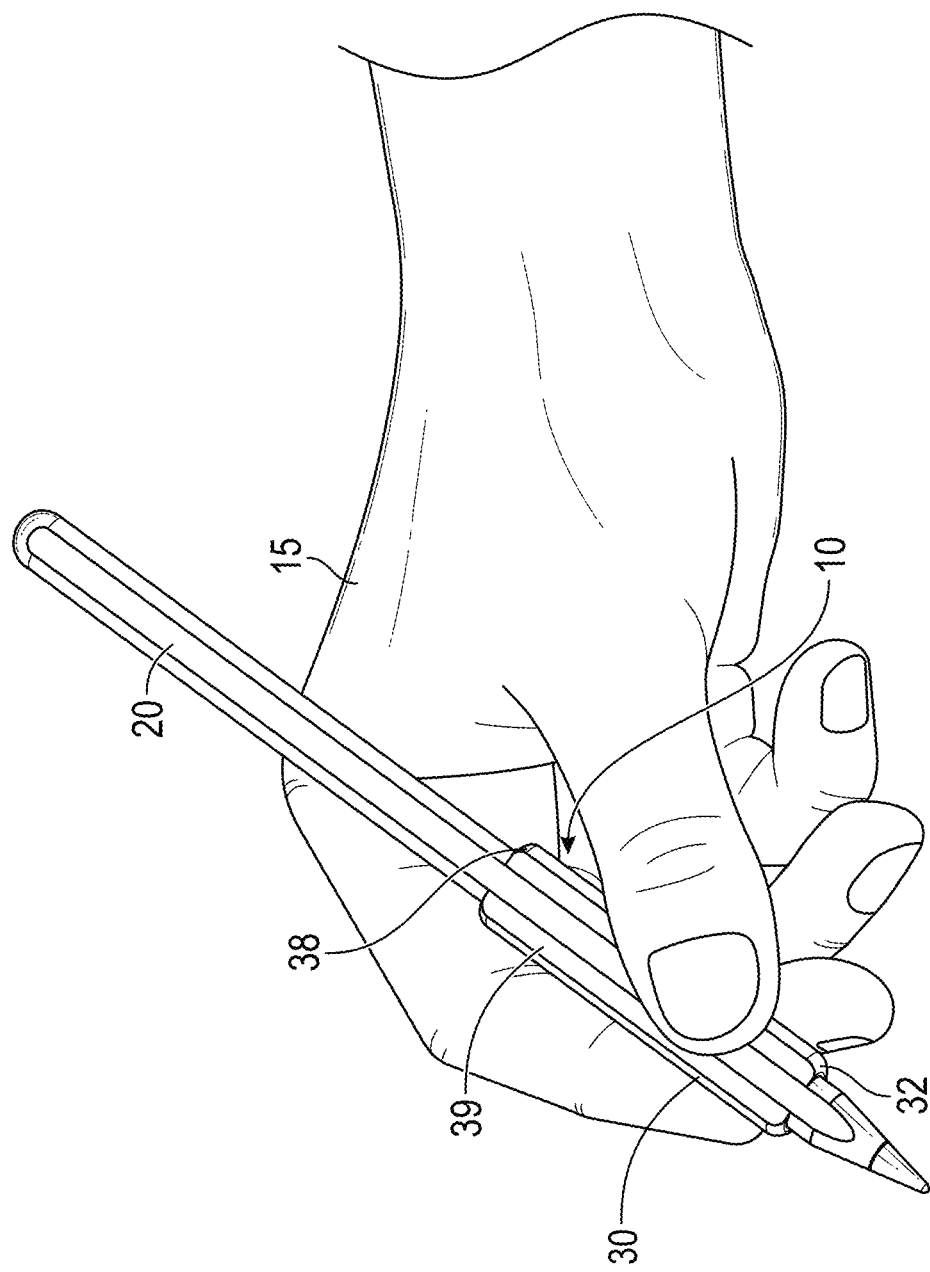
FIG. 1 is a perspective view of a user utilizing the present invention with a stylus.
Figure 2:
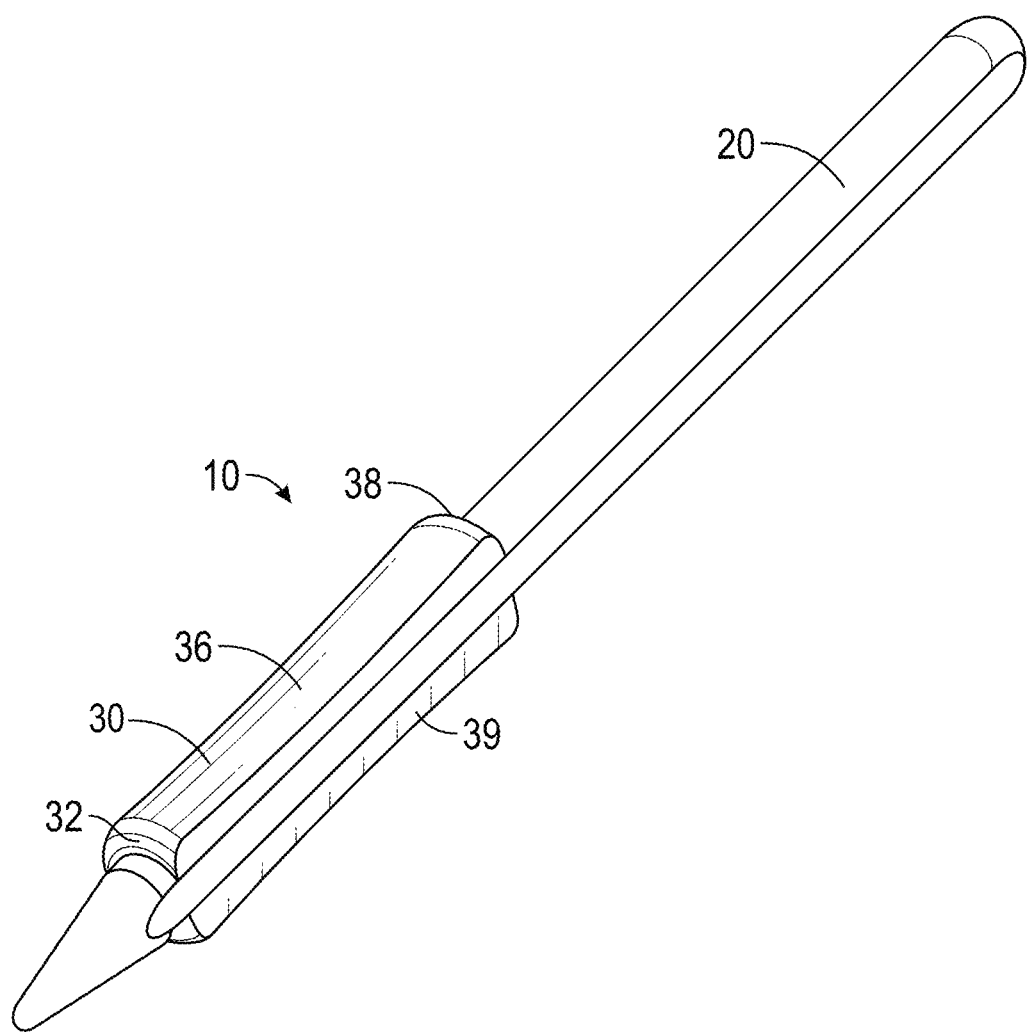
FIG. 2 is a perspective view thereof, showing an open truncated side edge of an elongated grip member.
Figure 3:
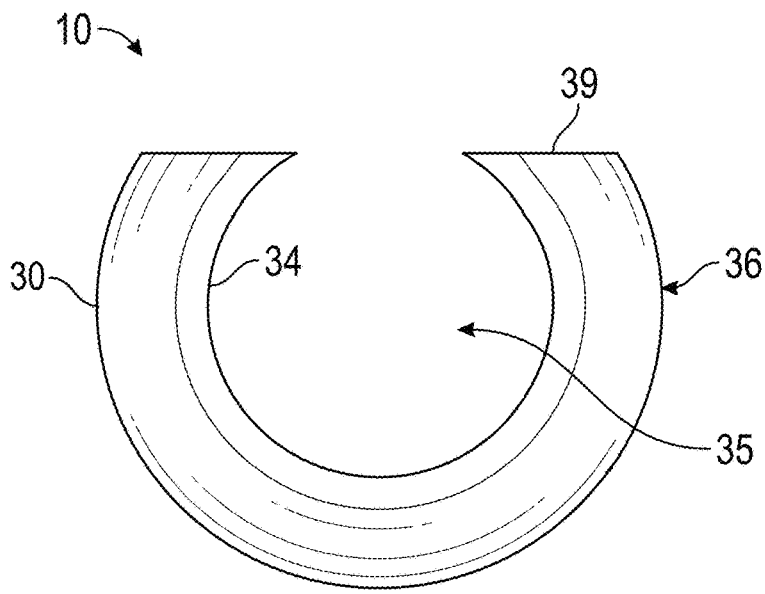
FIG. 3 is a front elevational view of the invention, illustrating a central bore formed within the elongated grip member.

FIGS. 1 and 3 illustrate a grip 10 for a cylindrical capacitive touch stylus 20 that comprises an elongated grip member 30. The elongated grip member 30 has a proximal end 32, an opposing distal end 38, an outer surface 36, and an inner surface 34 defined by a central bore 35. The elongated grip member 30 has an open truncated side edge 39 extending between the proximal end 32 and the distal end 38 to laterally expose the central bore 35.

Figure 8:
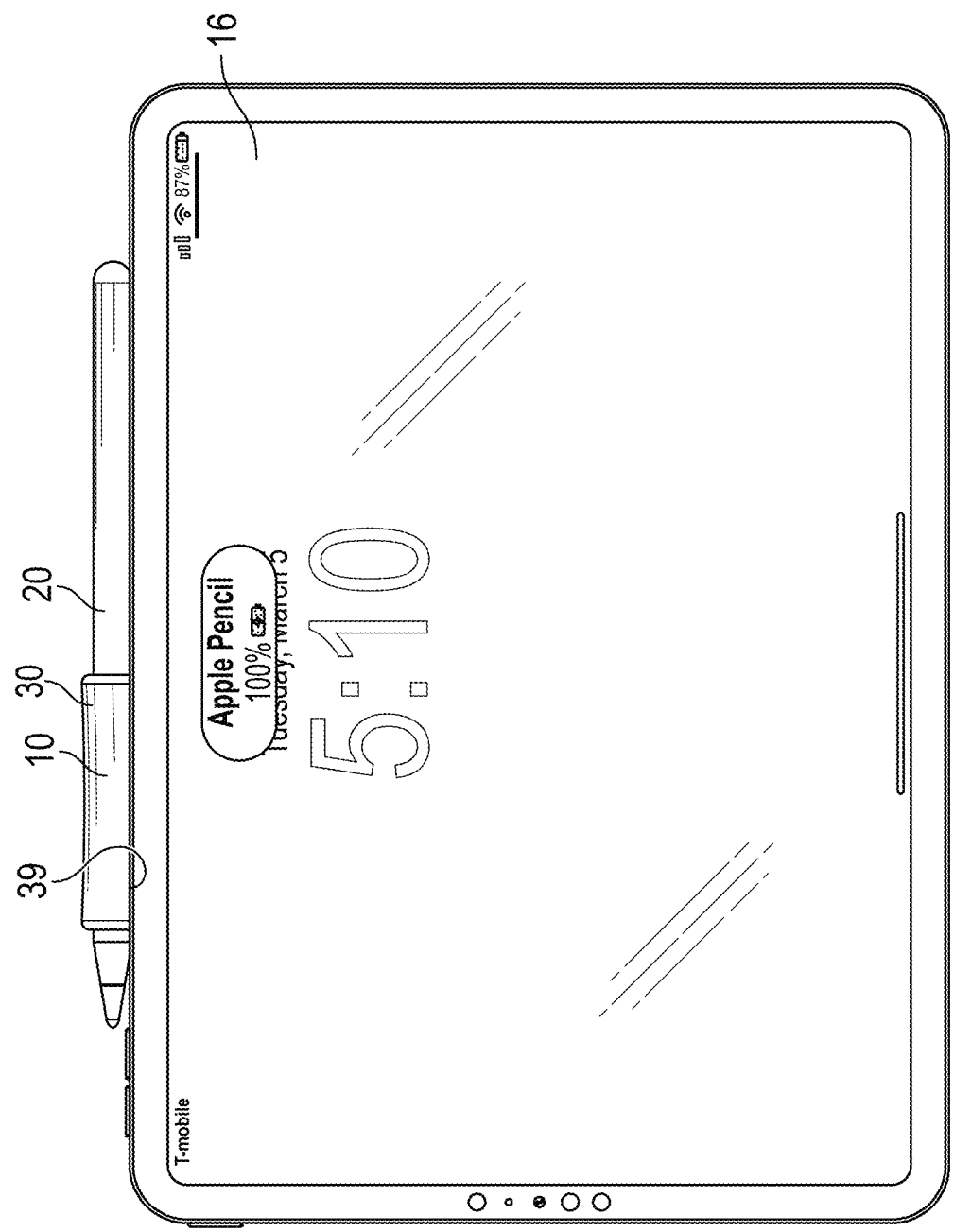
FIG. 8 is a side elevational view of the invention, as used with a stylus and a wireless charging device.

The elongated grip member 30 comprises a resilient material that does not scratch or otherwise damage the stylus 20 when the stylus 20 is inserted into the central bore 35. Suitable resilient materials for the elongated grip member 30 may include, but are not limited to, silicone rubber, thermoplastic elastomers (TPE), polyurethane, neoprene, or other resilient or flexible polymers. With the stylus 20 extending through the central bore 35 of the elongated grip member 30, a user using the grip 10 and the stylus 20 can contact the stylus 20 at the truncated side edge 39 to effect capacitive touch interaction with the stylus 20 (FIG. 1), wherein the user 15 physically is able to contact the stylus 20. Further, the stylus 20 and the grip 10 may be placed onto a wireless charging device 16 (FIG. 8) at the open truncated side edge 39 to provide unobstructed inductive charging of the stylus 20.

Figure 5:
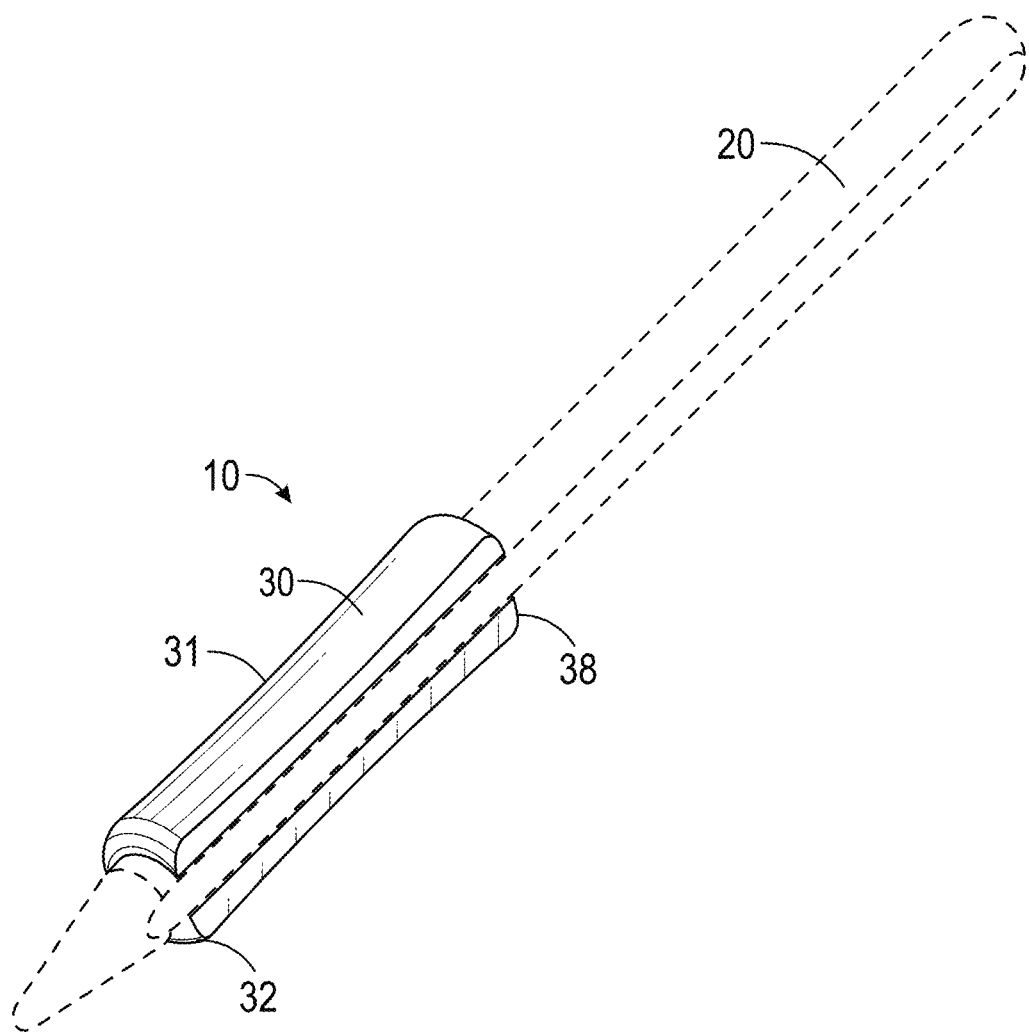
FIG. 5 is a perspective view of an alternate embodiment of the invention.
Figure 6:
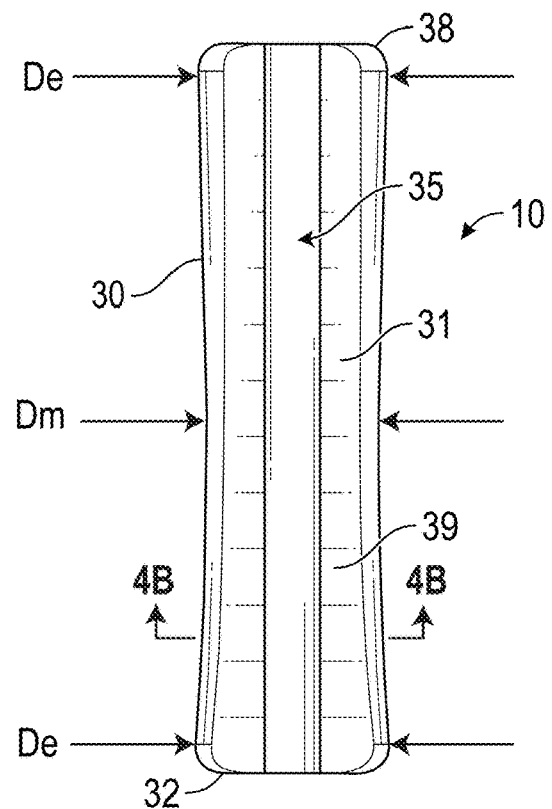
FIG. 6 is a side elevational view of the invention shown in at least FIG. 5.

In some embodiments, a diameter Dm across a mid-point 31 (FIGS. 5 and 6) of the elongated grip member 30 is less than a diameter De across the elongated grip member 30 at either of its ends 32, 38. This configuration may provide an ergonomic shape that fits comfortably in a user's hand.

Figure 7:
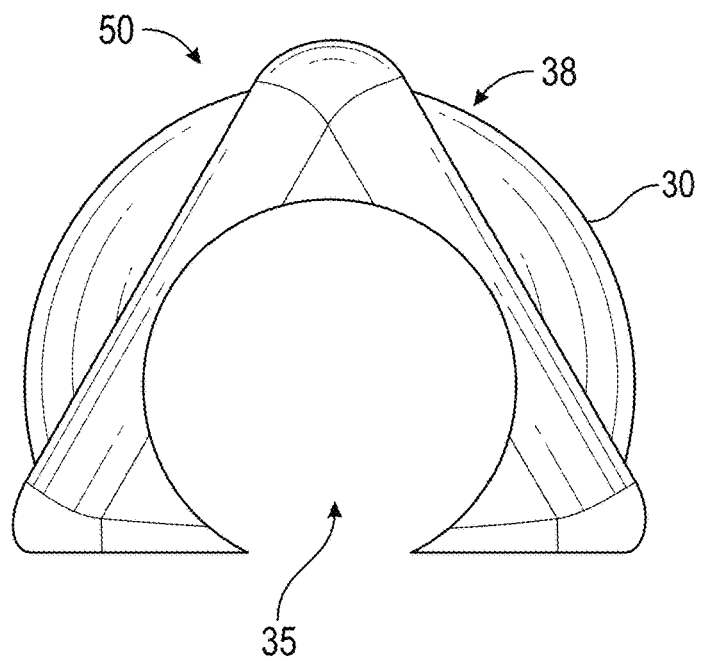
FIG. 7 is a front elevational view of another alternate embodiment of the invention.

In certain implementations, the distal end 38 of the elongated grip member 30 is generally circular, and the proximal end 32 of the elongated grip member 30 is generally triangular, having a triangular shape 50 (FIG. 7). The circular distal end 38 may facilitate smooth rotation of the grip 10, while the triangular proximal end 32 may provide an ergonomic base and prevent rolling when the grip 10 is being used.

Figure 4A:
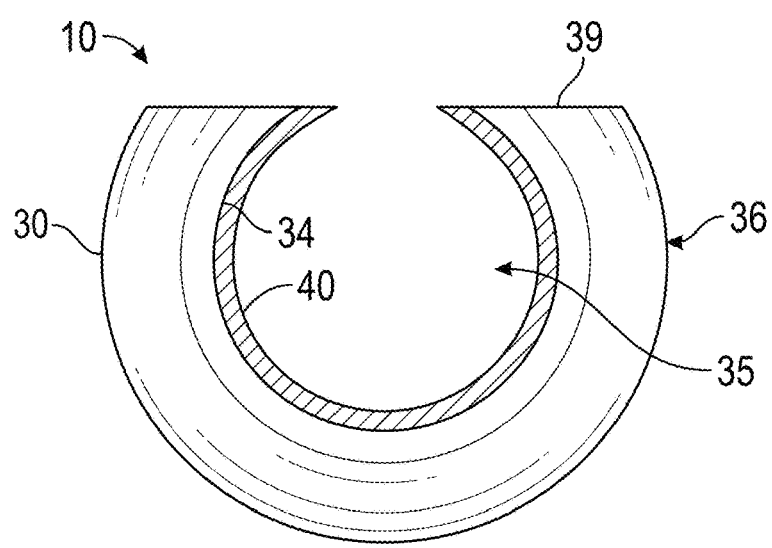
FIG. 4A is a front elevational view of an alternate embodiment thereof, illustrated with a semi-rigid inner C-shaped sleeve.

Some embodiments may further include a semi-rigid, inner C-shaped sleeve 40 (FIG. 4A) fixed with the inner surface 34 of the elongated grip member 30. The inner C-shaped sleeve 40 is configured to flex outwardly to receive the stylus 20 therein and to frictionally hold the grip 10 to the stylus 20. Suitable materials for the inner C-shaped sleeve 40 may include, but are not limited to, spring steel, polycarbonate, acrylonitrile butadiene styrene (ABS), polyoxymethylene (POM), or the like.

Figure 4B:
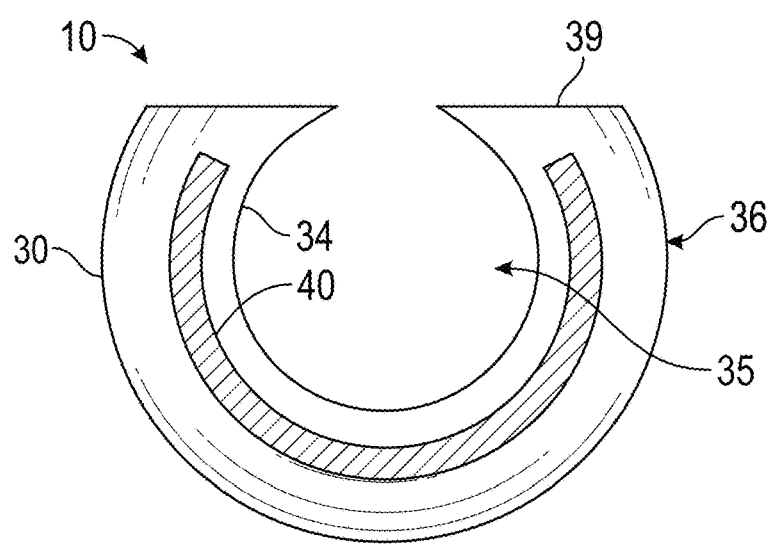
FIG. 4B is a cross-sectional view of another alternate embodiment thereof, taken along line 4B-4B of FIG. 6, illustrated with the semi-rigid inner C-shaped sleeve inserted within the elongated grip member.

In some embodiments, the inner C-shaped sleeve 40 is fixed within the elongated grip member 30 (FIG. 4B), such that the stylus 20 contacts the inner surface 34 of the elongated grip member 30, while the C-shaped sleeve 40 still provides increased rigidity to frictionally hold the grip 10 to the stylus 20.

In certain implementations, the inner C-shaped sleeve 40 is less resilient than the elongated grip member 30. This difference in resiliency allows the inner C-shaped sleeve 40 to provide a secure hold on the stylus 20 while the elongated grip member 30 maintains a comfortable, cushioned feel for the user 15.

The grip 10 with the diameter Dm across the mid-point 31 being less than the diameter De at the ends 32,38 may also include the semi-rigid, inner C-shaped sleeve 40 fixed with the inner surface 34 of the elongated grip member 30. This combination provides both ergonomic comfort and secure attachment to the stylus 20.

While a particular form of the invention has been illustrated and described, it will be apparent that various modifications can be made without departing from the spirit and scope of the invention. For example, other cross-sectional shapes of the elongated grip member may be utilized as desired. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description."

While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A grip for a cylindrical capacitive touch stylus, comprising:
   an elongated grip member having a proximal end, an opposing distal end, an outer surface, and an inner surface defined by a central bore, the elongated grip member further having an open truncated side edge extending from the proximal end to the distal end to laterally expose the central bore; and
   a semi-rigid, inner C-shaped sleeve fixed with the inner surface of the elongated grip member, the inner C-shaped sleeve configured to flex outwardly to receive the stylus therein and to frictionally hold the grip to the stylus, the inner C-shaped sleeve being less resilient than the elongated grip member;
   wherein the outer surface, the inner surface, and the open truncated side edge of the elongated grip member each comprise a resilient material that extends from the proximal end to the distal end of the elongated grip member;
   whereby with the stylus extending through the central bore of the elongated grip member, a user using the grip and the stylus can contact the stylus at the truncated side edge to effect capacitive touch to the stylus.

2. The grip of claim 1 wherein a diameter across a mid-point of the elongated grip member is less than a diameter across the elongated grip member at either of its ends.

3. The grip of claim 1 wherein the distal end of the elongated grip member is partially circular, and wherein the proximal end of the elongated grip member is partially triangular.

4. A grip for a cylindrical capacitive touch stylus, comprising:
   an elongated grip member comprising a resilient material and having:
   a proximal end;
   an opposing distal end;
   an outer surface;
   an inner surface defining a central bore; and
   an open truncated side edge extending between the proximal end and the distal end, the open truncated side edge laterally exposing the central bore; and
   the grip further comprising a semi-rigid, inner C-shaped sleeve fixed with the inner surface of the elongated grip member, the inner C-shaped sleeve being less resilient than the elongated grip member;
   wherein the inner C-shaped sleeve is configured to flex outwardly to receive the stylus therein and to frictionally hold the grip to the stylus;
   wherein the grip is configured such that with the stylus extending through the central bore of the elongated grip member, a user can contact the stylus through the open truncated side edge to enable capacitive touch interaction with the stylus.

5. The grip of claim 4 wherein a diameter across a mid-point of the elongated grip member is less than a diameter across the elongated grip member at either of its ends.

6. The grip of claim 4 wherein the distal end of the elongated grip member is partially circular, and wherein the proximal end of the elongated grip member is partially triangular.

7. A grip for a cylindrical capacitive touch stylus, comprising:
   an elongated grip member comprising a resilient material and having:
   a proximal end;
   an opposing distal end;
   an outer surface;
   an inner surface defining a central bore; and
   an open truncated side edge extending between the proximal end and the distal end, the open truncated side edge laterally exposing the central bore; and
   the grip further comprising a semi-rigid, inner C-shaped sleeve fixed within the elongated grip member, the inner C-shaped sleeve being less resilient than the elongated grip member;
   wherein with the stylus contacting the inner surface of the elongated grip member, the C-shaped sleeve provides increased rigidity to frictionally hold the grip to the stylus;
   wherein the grip is configured such that with the stylus extending through the central bore of the elongated grip member, a user can contact the stylus through the open truncated side edge to enable capacitive touch interaction with the stylus.

8. The grip of claim 7 wherein a diameter across a mid-point of the elongated grip member is less than a diameter across the elongated grip member at either of its ends.

9. The grip of claim 7 wherein the distal end of the elongated grip member is partially circular, and wherein the proximal end of the elongated grip member is partially triangular.

* * * * *